106. COMPOSITIONS, COATING OR PLASTIC.

84 Patented June 13, 1939

2,162,387

UNITED STATES PATENT OFFICE 2,162,387

PLASTIC COMPOUND

Noah B. Radabaugh, Mentor-on-the-Lake, Ohio

No Drawing. Application February 18, 1937, Serial No. 126,457

2 Claims. (Cl. 106—8)

This invention relates to a composition of matter that is used for sealing the joints between parts of metal that are subjected to heat, and is particularly useful for sealing the joints in hot water and steam boilers, and between those castings which cooperate to form the furnace chamber of a hot air furnace. Heretofore, 24 to 48 hours has been required for the setting of cements before a fire could be started in the furnace, for otherwise the cement would crack. The necessity for delay has been an objectionable feature in the use of high-temperature cements, because during such time, the furnace would remain idle, and thereby necessitate considerable inconvenience, and expense to the furnace owner.

An object of my invention is to make a cement which will set within a few minutes and thereby enable fire to be started in the furnace as soon as the castings have been assembled in their proper relationship.

The composition of matter which I have discovered has been found to give satisfactory results, as follows:—

| | Per cent |
|---|---|
| Powdered silicate soda | 8 |
| Asbestos fibre | 10 |
| Sand | 27 |
| Fire clay | 50 |
| Mineral wool | 5 |

The proportions mentioned being by weight.

The silicate of soda may be in powdered form of 100 mesh or finer and at least 70% soluble in water; the asbestos fibre may be that designated as shredded Canadian fibre of the C or E grade; the sand is preferably pure silica sand of 35 mesh or finer; the fire clay is that designated ground plastic of 30 mesh or finer, while the mineral wool may be in granulated form.

There is no particular sequence which must be followed in mixing the aforesaid ingredients for they may be all placed in a vessel and mixed until a thorough intermingling is accomplished; thereupon sufficient water is added to produce a mass comparable in plasticity to that of putty. The ingredients when intermingled and moistened will adhere together so that the mass can be molded and pressed in desired form; thereafter the particles will cement together without crumpling and cracking notwithstanding the fact that it may be subjected to a high degree of heat within a few minutes after the material has been put into use.

I claim:—

1. A composition of matter for a high temperature cement that can be subjected to the temperature of the furnace in which it is to be used for sealing joints, said composition having the properties of a non-fusible slightly pliable cement comprising a mixture of substantially eight percent silicate of soda, ten percent asbestos fibre, twenty-seven percent sand, fifty percent fire clay and five percent mineral wool.

2. A composition of matter for a high temperature cement that can be subjected to the temperature of the furnace in which it is to be used for sealing joints, said composition having the properties of a non-fusible slightly pliable cement comprising a mixture of substantially equal parts of silicate soda and asbestos fibre, a larger portion of said, a major portion of fire clay and a minimum portion of mineral wool.

NOAH B. RADABAUGH.